United States Patent Office 3,181,970
Patented May 4, 1965

3,181,970
COATED WELDING ELECTRODE
James V. Peck, Plainfield, and Charles E. Witherell, Bound Brook, N.J., assignors to The International Nickel Company, Inc., New York, N.Y., a corporation of Delaware
No Drawing. Filed Nov. 21, 1962, Ser. No. 239,337
7 Claims. (Cl. 117—205)

The present invention relates to nickel-base welding materials and, more particularly, to nickel-chromium welding electrodes.

It is well known that it has been the aim of designers of power plants, e.g., steam power plants, to produce more power per quantity of fuel consumed and thereby increase plant efficiency. This is of the utmost importance economically. For instance, the steadily increasing efficiency of steam power plants has made it possible to maintain a relatively constant price level for electrical power over the years in spite of soaring labor, material and overhead expenses. This increase in efficiency has largely come through the use of higher operating steam pressures and temperatures.

New materials are also needed which are able to withstand the increasing pressures and temperatures. For example, when the inlet steam temperatures were below about 1050° F. the ferritic low-alloy steel pipe materials of the carbon-molybdenum and chromium-molybdenum types containing up to about 9% chromium and up to about 1% molybdenum were generally satisfactory and found extensive use. On the other hand, above about 1050° F., the use of such ferritic alloys could not be justified because their rapidly decreasing creep strength would require excessively heavy wall thicknesses to withstand the pressure. Consequently, they were economically unfeasible.

In order to meet the demands of power plant designers for still higher temperatures and pressures, austenitic stainless steels were used in lieu of the ferritic low-alloy steels. The reason for the change was that the austenitic strainless steels ordinarily have greater creep strength at elevated temperatures than do the ferritic steels. In general, the austenitic steels may be used when the steam temperatures are between about 1050° F. and 1200° F. Even then, the austenitic stainless steels were not a complete solution since they are generally difficult to weld, i.e., such welded stainless steels often exhibit a tendency to crack both in the weld and the heat-affected zone.

In order to find suitable welding materials to successfully weld the austenitic stainless steels, the art developed welding materials that would introduce a small amount of ferrite into the solidified weld. While this small amount of ferrite is capable of eliminating weld cracking, it too suffers from disadvantages. For example, an exposure of a weld containing a small amount of ferrite to elevated temperatures, e.g., 1000° F. to 1700° F., for extended periods of time transforms the ferrite to a brittle phase, apparently the sigma phase. Furthermore, when the ferrite phase is present in amounts greater than about 2% of the weld deposit, it seriously impairs creep strength and stress-rupture properties. Thus, welding problems have prevented designers from taking advantage of increased efficiency through the use of higher inlet temperatures and pressures. In view of these problems, there has been a trend in the direction of decreasing the pressure and temperatures and, consequently, the plant efficiency. This reversal by the power plant designers has been attributed to economics. Basically, the premise is simply that the use of either the ferritic low-alloy steel or the austenitic stainless steel requires the uneconomic use of heavy walled and/or very thick metal sections in order to withstand the higher temperatures and pressures. Thus the art has been stymied in its search for higher efficiencies through use of higher inlet temperatures and pressures primarily because of welding difficulties.

Although many attempts were made to overcome the foregoing difficulties and other disadvantages, none, as far as we are aware, was entirely successful when carried into practice commercially on an industrial scale.

It has now been discovered that strong, ductile, non-porous, austenitic, sound welds and overlays, including iron-diluted welds and overlays, can be produced in all positions by employing a special nickel-chromium alloy welding electrode.

It is an object of the present invention to provide an improved welding electrode which is adapted for use in all positions.

It is also an object of the present invention to provide a nickel-containing welding electrode which, in use, produces weld deposits which are especially suited for high-temperature long-time service even at temperatures above 1000° F.

Still another object of the invention contemplates an improvement in the process for welding and/or overlaying similar and dissimilar high-temperature-service metals and alloys with welds that are substantially free of cracks and porosity even when diluted with appreciable amounts of iron.

It is a further object to provide an improved welded structure which is particularly adapted for high-temperature long-time service.

Other objects and advantages will become apparent from the following description:

Broadly stated, the present invention contemplates an all-position, coated welding electrode having a nickel-base core and a manganese carbonate-alkaline earth metal carbonate-cryolite-titania type flux. In general, the nickel-base core contains, by weight, about 10% to about 25% chromium, up to about 2% titanium, up to about 1% aluminum, the sum of titanium and aluminm being abot 0.5% to about 2%, up to about 10% iron, up to about 8% columbium, up to about 8% molybdenum, up to about 4% tungsten, up to about 0.5% silicon, up to about 3% manganese, up to about 0.3% magnesium, up to about 0.1% carbon, up to about 0.05% zirconium, up to about 0.005% boron and small amounts of the usual deoxidants, impurities and incidental elements. The core may also contain a small amount of cobalt, e.g., up to about 2%, by weight of the core, although advantageously, the cobalt content should not exceed about 0.1%. The electrode, i.e., the core and flux, contains, by weight of the electrode, up to about 4% molybdenum, up to about 3% tungsten, the sum of tungsten and twice molybdenum being at least about 1.5%, and about 1.5% to about 10% columbium with the columbium, molybdenum and tungsten being so correlated that the sum of columbium and tungsten and twice molybdenum is at least about 3.5% to about 15%, so that together with the flux and the core ingredients, an arc-welding electrode is obtained which provides sound, substantially crack-free weld deposits and/or overlays which are particularly adapted for long-time service at elevated temperatures, e.g., about 1000° F. or even higher. In general, the columbium and tungsten plus molybdenum may be present partly in the flux and partly in the core or may be present entirely in the flux or entirely in the core as indicated hereinafter. The balance of the core is essentially nickel with the nickel content being at least about 55%. The balance of the flux comprises slagging and fluxing ingredients, e.g., manganese carbonate, alkaline earth metal carbonate, titania and cryolite, in amounts of at least about 40% by weight of the dry flux. This special electrode containing a unique combination of ingredients in special proportions has good operability and slagging characteristics in all positions, including the overhead position. Advantageously, the core is in the form of an alloy, e.g., wire.

The electrodes having the composition hereinbefore set forth produce, in use, weld deposits and/or overlays including those diluted with substantial iron, with excellent metallurgical and mechanical properties and/or characteristics such as excellent strength at elevated temperatures for prolonged periods of time. Moreover, the coated electrodes of this invention having a titania-carbonate-cryolite flux afford optimum operability and provide the desired high level of weld quality. Each ingredient of the electrode serves a particular function with each and every other ingredient of the electrode. For example, columbium in the amounts hereinbefore set forth, i.e., about 1.5% to about 10% by weight of the electrode, is an essential constituent of the coated electrodes of this invention. In combination with the remaining ingredients of the electrode, this ingredient also contributes importantly to weld soundness, increases the tolerance of the weld deposit to iron dilution and aids in the solid-solution strengthening of the weld metal without rendering the weld metal age-hardenable. In order to obtain the maximum benefit of columbium additions to the welding electrodes of this invention, it is advantageous that about 2% to about 8% columbium, e.g. about 5%, by weight of the electrode, be present. As previously stated, the columbium of the welding electrodes of this invention may be present partly in the flux and partly in the core or it may be present entirely in the core or entirely in the flux. Thus, the core may contain up to 8% columbium by weight of the core and the flux may contain up to 35% columbium by weight of the flux. When the columbium is present entirely in the core, the percentage of columbium is about 2% to about 8% in the core. On the other hand, when the columbium is present entirely in the flux, it is present in a range of about 10% to about 35% of the flux. Advantageously, columbium is present partly in the core and partly in the flux since excessive columbium in the core wire causes the alloy to become excessively stiff which in turn may cause intergranular rupture to occur during hot working and/or processing the core material to core dimensions, e.g., a wire having a 3/16 inch diameter. On the other hand, if too much columbium is in the flux as a metallic addition (usually in the form of ferrocolumbium alloy containing, for example, 60% columbium by weight), it is detrimental to the properties and/or characteristics of the weld deposit since the time allowed for alloying from a flux is quite short and often results in inadequate diffusion. Thus, there would be areas which are columbium-poor and, accordingly there would be some weak areas in the weld deposit. In view thereof, columbium is advantageously present in amounts of about 2.5% to about 6.5% by weight in the core and in amounts of about 1% to about 25% by weight in the flux so long as the electrode contains about 2% to about 8% of columbium by weight of the electrode. A small amount of tantalum is commonly associated with columbium in the forms in which columbium is commercially available. Therefore, the coated electrodes of this invention can also contain such tantalum introduced into them with the columbium, and any such tantalum up to about 1/5 the columbium is included as columbium for the purposes of this invention.

Either tungsten or molybdenum or both must be present in the electrode in the amounts hereinbefore set forth. Thus, the electrode contains up to about 3% tungsten and up to about 4% molybdenum provided that the sum of tungsten percent and twice molybdenum percent, i.e., percent W+2(percent Mo), is at least about 1.5%. From this statement, it can be seen that molybdenum is about twice as effective as tungsten. These elements along with the columbium (Cb) contribute to the solid-solution strengthening of weld deposits produced by the electrodes of this invention, i.e., they act as strengtheners. These elements appear to have a strong correlation one with the other so that there is a synergistic effect of the elements in the weld deposit. This relationship is given by the equation:

$$\text{Percent Cb} + [\text{percent W} + 2(\text{percent Mo})] \geq 3.5$$

Advantageously, some of each element is included in the electrode to obtain optimum strength and metallurgical stability in weld deposits produced by using the electrodes of this invention. Thus, about 2% to about 8% columbium, about 1.8% to about 2.5% tungsten and about 1.8% to about 2.5% molybdenum contained in the electrode have been found to be the optimum contents of each of these elements. Again, as in the case of columbium, tungsten and/or molybdenum may be included entirely in the flux or entirely in the core or partly in the flux and partly in the core. Thus, the flux may contain up to 12.5% each of tungsten and molybdenum, and the core may contain up to 8% molybdenum and up to 4% tungsten. However, in all cases, the sum of tungsten and twice molybdenum is at least about 1.5% by weight of the electrode. Advantageously, tungsten and/or molybdenum are included partly in the flux and partly in the core when they are employed in the high end of the range since too much of either or both in the core renders the core material difficult to work into a welding core. It is desirable that all the tungsten or molybdenum not be in the flux since these expensive metals do not have sufficient time to adequately diffuse and thus afford their designed strengthening effect to the weld deposit alloy.

The core of the electrode contemplated by the present invention advantageously is a nickel-chromium alloy wire containing special proportions of nickel, chromium and titanium. The ingredients of the core form the bulk of the weld deposit and each element included therein in combination with the remaining ingredients of the electrode must be present in the amounts herein set forth. For example, the chromium content of the deposit is important to the corrosion and oxidation resistance of the alloy at elevated temperatures as well as to the mechanical properties. Decreases in chromium much below about 10% will be reflected in the loss of tensile properties and a deterioration of surface conditions at elevated temperatures. On the other hand, an increase in chromium of about 25% would serve to stiffen the alloy excessively and cause some forging or mill processing difficulties. Nickel, of course, must be present in the core to provide the desired strength and corrosion-resistance in the weld metal.

Either titanium (in amounts of up to 2%) or aluminum (in amounts of up to about 1%) or both titanium and aluminum (in amounts of about 0.5% to about 2%) must be present in the core. These elements help in strengthening the weld deposit. However, titanium should not be present in the weld deposit in amounts in excess of about 1% since the weld deposit will precipitation harden, embrittle and lose ductility when exposed to temperatures of 1000° F. or higher. Consequently, the weld deposit will lose the very desirable characteristic of maintaining good strength even when exposed to elevated temperatures for prolonged periods of time. When aluminum is present in the core, the total titanium plus aluminum content in the weld deposit should not exceed 1% as the combination of these two ingredients will have the same detrimental precipitation hardening effect. On the other hand, titanium and aluminum are useful deoxidizers and are needed in the weld fusion to insure soundness and freedom from porosity especially in out-of-position welding, e.g., overhead welding. These elements can be added to the core wire in relatively large amounts of up to about 2% in total, e.g., up to about 1% of each, without an embrittling tendency being imparted to the weld because they are relatively volatile under the heat of the welding arc and only a small percentage of each is recovered in the weld. In this connection, the percentage of recovery of aluminum and titanium across the arc is in the vicinity of about 5% to about 50%.

Silicon, an optional ingredient of the core, should be kept below about 0.5% since its effect on weld quality is exceedingly detrimental. In addition, the optional carbon content of the electrodes of this invention should also be minimized since any recovery of carbon above about 0.05% in the weld deposit tends to increase the sensitivity to corrosion of the weld deposit particularly in iron diluted deposits. In addition, carbon may form carbides with the columbium of the electrode and substantially diminish the benefits of columbium to weld soundness and mechanical properties.

Boron, zirconium and magnesium, each of which is optionally included in the electrodes (usually in the core) of this invention, have a beneficial effect when included therein. For example, magnesium resists any residual sulfur and its presence in the weld deposit appears to be beneficial since it increases ductility particularly at temperatures around 1200° F. Boron and zirconium are added to the core alloy in order to increase its forgeability. However, these elements in excessive amounts, i.e., more than 0.005% boron and more than 0.05% zirconium, are strongly detrimental to weldability and only those amounts necessary for mill processing of the alloy should be added.

Advantageously, the core wire has a composition as shown in Table I (in percent by weight of the core).

*Table I*

| Element | Advantageous range, percent | Example, percent |
|---|---|---|
| Nickel | Balance, at least 60 | 67.5 |
| Chromium | 13 to 20 | 15 |
| Iron | 6 to 8 | 7 |
| Tungsten | 2.5 to 3.5 | 3 |
| Columbium | 2.5 to 6.5 | 3 |
| Molybdenum | 1.5 to 3.5 | 3 |
| Columbium+molybdenum +tungsten | At least 8.75 | 9 |
| Titanium | 0.5 to 0.9 | 0.6 |
| Aluminum | Up to 0.5 | 0.4 |
| Manganese | Up to 1.5 | 0.2 |
| Silicon | Up to 0.05 | <0.05 |
| Magnesium | 0.01 to 0.1 | 0.02 |
| Carbon | Up to 0.07 | 0.05 |
| Zirconium | Up to 0.03 | 0.03 |
| Boron | Up to 0.005 | 0.005 |
| Cobalt | Up to 0.1 | <0.1 |

The dry flux contemplated by the present invention for use in combination with the cores and electrode compositions hereinbefore set forth comprises about 20% to about 40% of the weight of the electrode, i.e., core and flux. In general, the dry flux is of the titania-manganese carbonate-alkaline earth metal carbonate-cryolite type containing, by weight of dry flux, about 10% to about 35% titania, about 5% to about 30% of manganese carbonate, about 15% to about 40% alkaline earth metal carbonate selected from the group consisting of calcium carbonate, barium carbonate, strontium carbonate and combinations thereof, up to about 35% columbium, up to about 30% iron, up to about 20% manganese, up to about 25% tungsten, up to about 25% molybdenum and about 10% to about 35% cryolite. Thus, the flux comprises fluxing and slagging non-metallic substances, e.g., cryolite, with or without alloying ingredients, e.g., tungsten, molybdenum and columbium. The manganese carbonate, alkaline earth metal carbonate, titania and cryolite are the flux-forming and slag-forming ingredients. The manganese carbonate, in addition to its very essential role as an ingredient contributing importantly to the operability of the electrode when used in combination with the remaining ingredients of the electrode in the amounts hereinbefore set forth, also serves to furnish the essential amounts of manganese to the weld deposit, i.e., at least about 0.2%. Thus, manganese is a necessary constituent of the weld deposit to obtain soundness thereof, i.e., freedom from hot cracking and freedom from porosity, particularly in highly restrained and/or thick sections and manganese carbonate provides this manganese to the weld deposit. Manganese metal can also be included in the flux in amounts of up to about 20% by weight of the flux as it may also contribute to the furnishing of manganese to the weld deposit. When included in the flux, it can be in the form of electrolytic manganese or ferromanganese, etc. Manganese can also be added to the core in amounts of up to about 3% by weight of the core. Thus, elemental manganese, if present, may be partly in the core and partly in the flux or entirely in the flux or entirely in the core. Advantageously, the manganese, if present, is included solely in the flux since its principal function is to reduce weld cracking and only small amounts of manganese, i.e., at least about 0.2% to no more than about 4.5%, should be recovered across the arc.

The electrode flux having the combination of ingredients hereinbefore set forth affords optimum operability in conjunction with the core wire and other ingredients of the electrode, e.g., columbium, molybdenum, tungsten, and provides the desired high level of weld quality in combination with excellent operability as well as producing deposits which exhibit good strength at high temperatures for prolonged periods and which are very tolerant of iron dilution so that the less expensive ferroalloys can be used to introduce alloying ingredients such as molybdenum, tungsten and columbium into the flux.

In addition to the aforementioned ingredients of the flux, it may also contain extrudability aids such as bentonite or other colloidal clays and humectants such as alginates, gums, glycolates, sodium carboxymethyl cellulose, etc., can be added in amounts totaling up to about 5% by weight of the flux to improve its extrudability.

In carrying the invention into practice, it is advantageous to use the particular ingredients of the dry flux in the amounts set forth in the following Table II (in percent by weight of the dry flux):

*Table II*

| Preferred ingredients | Advantageous range, percent | Example, percent |
|---|---|---|
| Calcium carbonate | 20 to 30 | 25 |
| Cryolite | 12 to 25 | 18 |
| Manganese carbonate | 12 to 25 | 18 |
| Titanium dioxide | 12 to 25 | 18 |
| Columbium* | 1 to 25 | 10.8 |
| Iron* | | 7.2 |
| Bentonite | 2 to 5 | 3 |

*For example, as a ferrocolumbium alloy containing about 60% columbium by weight. Thus, iron is present in amounts of about 7.2 parts in the Example.

The ingredients used in making the flux are powdered ingredients. In general, the mixed ingredients usually have a particle size of between about 50 microns and about 300 microns, although flux ingredients having a different particle size can also be used, as those skilled in the art will readily understand.

A water dispersible binder ordinarily is employed with the flux to provide a durable and hard coating on the nickel-chromium core after drying and baking. The binder, advantageously, is of the silicate type as it produces a durable coating that does not require a rebake prior to use. The silicate type binder may be an aqueous solution of sodium silicate and/or potassium silicate. The following Table III gives the amounts (in percent by weight of the dry flux) of ingredients which can be used for the binder. It is to be noted, however, that a silicate solution of a different specific gravity than shown herein also can be used.

Table III

| Ingredient | Range, percent | Example, percent |
| --- | --- | --- |
| Sodium silicate solution (47° Baumé) | 10 to 20 | 15 |
| Water | As needed for extrudability. | 2 |

The flux can be applied to the core in any suitable manner, e.g., by an extrusion process, and dried on the surface by suitable drying and/or baking. This results in a hard adherent coating of high mechanical strength which is relatively resistant to mechanical damage under normal handling conditions. A satisfactory drying or baking treatment of the flux and binder mixture comprises a normal continuous oven drying treatment followed by a baking treatment which comprises gradually raising the temperature to about 600° F. and holding at that level for about two hours.

Examples of typical electrode dimensions (core diameter plus flux thicknesses) are given in Table IV:

Table IV

| Core diameter, inch | Range electrode diameter, inch | Example electrode diameter, inch |
| --- | --- | --- |
| 3/32 | 0.12 to 0.15 | 0.13 |
| 1/8 | 0.17 to 0.2 | 0.18 |
| 5/32 | 0.21 to 0.23 | 0.22 |
| 3/16 | 0.25 to 0.27 | 0.26 |

However, it is permissible, as will be apparent to those skilled in the art, to vary considerably the thicknesses of core diameter and flux from those proportions given in the preceding Table IV.

The compositions of the deposits and/or overlays, of course, will vary somewhat depending upon the exact composition of the flux, the composition of the core wire and the composition of the base metal being welded. Furthermore, the combination of any of the flux compositions with any of the compositions of the cores hereinbefore set forth are within the scope of the present invention. However, all-weld-metal deposits produced using the electrodes of this invention will have compositions as shown in Table V:

Table V

| Ingredients | Range, weight percent | Advantageous range, weight percent | Example, weight percent |
| --- | --- | --- | --- |
| Chromium | 10 to 25 | 14 to 17 | 15. |
| Iron | Up to 10 | 6 to 8 | 7. |
| Tungsten | Up to 4 | 2.5 to 3.5 | 3. |
| Molybdenum | Up to 5 | 1.5 to 3.5 | 2. |
| W+2Mo | At least 1.5 | | |
| Columbium | 1.5 to 8 | 2.5 to 6.5 | 4. |
| Cb+W+2Mo | At least 3.5 | | |
| Cb+W+Mo | | At least 8.75 | 9. |
| Titanium | Up to 0.7 | Up to 0.2 | 0.05. |
| Aluminum | Up to 0.5 | Up to 0.1 | 0.05. |
| Manganese | 0.2 to 4.5 | 0.5 to 2 | 1.5. |
| Silicon | Up to 1 | Up to 0.7 | 0.5. |
| Magnesium | Up to 0.1 | Up to 0.03 | 0.01. |
| Carbon | Up to 0.15 | Up to 0.1 | 0.05. |
| Zirconium | Up to 0.01 | Up to 0.01 | Present, <0.01. |
| Boron | Up to 0.003 | Up to 0.003 | Present, <0.003. |
| Cobalt | Up to 2 | Up to 0.1 | Present, <0.1. |
| Nickel | Balance, at least about 55. | Balance, at least about 60. | 67. |

It is also within the scope of this invention to employ electrodes having flux cores or comprised of powdered metal compacts within a thin metallic sheath so long as the composition of the weld deposits falls within the ranges tabulated in Table V.

For the purpose of giving those skilled in the art a better understanding of the invention and a better appreciation of the advantages of the invention, the following illustrative examples are given:

EXAMPLE I

An electrode was prepared from a core wire containing about 15% chromium, about 7% iron, 3% tungsten, about 3% molybdenum, about 3% columbium, about 0.6% titanium, about 0.4% aluminum, about 0.2% manganese, about 0.05% silicon, about 0.02% magnesium, about 0.05% carbon, about 0.03% zirconium, about 0.005% boron, about 0.1% cobalt with the balance nickel. The core was coated with a flux composition set forth under Example in Table II, by extrusion, using a binder consisting of about 15% by weight of sodium silicate solution (47° Baumé) and about 2% by weight water. The electrode thus constituted was oven dried and subsequently baked at 600° F. for two hours.

EXAMPLE II

A butt weld was prepared between two plates 1" x 5" x 6" of AISI Type 347 stainless steel of the following composition: 18.55% chromium, 11.43% nickel, 0.79% columbium, 0.02% molybdenum, 0.055% carbon, 0.67% silicon, 1.65% manganese, 0.020% sulfur, 0.023% phosphorus and the balance iron. The electrode used was a 5/32 inch diameter coated electrode comprised of a core wire of the following composition: 66.45% nickel, 15.65% chromium, 2.82% columbium plus tantalum, 3.19% tungsten, 2.87% molybdenum, 7.32% iron, 0.26% manganese, 0.2% silicon, 0.53% aluminum, 0.57% titanium, 0.06% carbon, 0.04% copper, 0.011% magnesium, 0.005% boron, 0.032% zirconium and 0.007% sulfur. The coating of this electrode was the same as set forth in Example I.

The joint was prepared by machining the six-inch edges of the two Type 347 stainless plates with a single U-groove configuration. The joint design provided a 30° angle between the joint members, 1/4 inch root radius and 3/32 inch root land. The joint was centered over a grooved copper backing bar set in the surface of the two inch thick steel welding table and was held in this position during welding by two heavy-duty C-clamps on each plate.

No preheat was applied and the maximum interpass temperature was held below 250° F., i.e., the temperature of the deposited weld metal was below about 250° F. before the next pass was started. The joint was completed in 19 passes. After welding, the joint was turned over and the root side of the weld was grooved out to remove penetration irregularities and a sealing pass was deposited in the groove. No defects of any kind were observed in an X-ray of the joint made at 2% sensitivity.

Two transverse slices were cut from this joint for a macroexamination of the weld. The cross sections of the weld were polished with a No. 200 grit rubber-bonded abrasive polishing wheel, etched with mixed acids to reveal the weld grain outline and examined at a magnification of 30 diameters (30×) for defects. No defects of any kind were observed in either side of the two weld cross-sectional slices.

The two sections were then given a 180° side bend test by bending over a 1½ inch diameter steel bar such that the weld transverse cross section of one side of the specimen was in tension. The bend test was considered complete when the two "legs" of the side bend test specimen were parallel. The bent surfaces of the specimens were then re-examined at 30× and no defects of any kind were observed in the weld or heat-affected zones of either specimen.

The remainder of the butt weld, from which the two side-bend slices had been cut, was then subjected to a heat treatment at 1200° F. for 48 hours and air cooled. The purpose of this treatment was to expose the weldment to a temperature similar to that for which the welding material was intended, and subsequently, to test the weldment for possible adverse effects as a result of the thermal treatment.

After the treatment, two ⅜ inch thick cross-sectional slices, similar to the two which had been cut from the joint in the as-welded condition, also were cut from the heat treated weldment. These two slices were subjected to the same examinations and side bend tests which were described previously for the as-welded specimens. Neither of these specimens which had been exposed to the 1200° F. temperatures for 48 hours showed any detrimental effects from the thermal treatment, as they sustained the full 180° severe side-bend test without evidence of any defect whatsoever in a 30× examination of the bent surfaces.

EXAMPLE III

Another butt weld, similar to the one in the previous example, was prepared between two plates 1″ x 5″ x 6″ of mild carbon steel of the following composition: 0.44% manganese, 0.19% carbon, 0.022% phosphorus, 0.051% sulfur and balance iron. The joint design, welding electrode and welding procedure were identical to those used for the weld between the AISI Type 347 stainless plates of the previous example.

Examinations of two ⅜ inch thick transverse slices cut from the completed weldment showed complete freedom from defects. Examination after subsequent side-bend tests of these slices, which also consisted of full 180° bends, showed freedom from defects of any kind.

EXAMPLE IV

A butt weld was made in the flat position between two plates of nickel-chromium alloy ⅝″ x 3″ x 6″ long using an electrode having a 5/32″ core wire and an electrode composition as set forth in Example I. Each plate was made from an alloy containing about 66.45% nickel, 15.65% chromium, about 2.82% columbium, about 3.19% tungsten, about 2.87% molybdenum, about 7.32% iron, about 0.26% manganese, about 0.2% silicon, about 0.53% aluminum, about 0.57% titanium, about 0.06% carbon, about 0.04% copper, about 0.011% magnesium, about 0.006% boron, about 0.032% zirconium and about 0.007% sulfur.

The weld joint was prepared by machining the 6″ edges of the two plates to produce a 30° single U-groove configuration at the mating edges. This joint design provided a ¼″ root radius, 3/32″ root land and a 1/16″ root spacing. The joint was then centered over a grooved copper backing bar set in the surface of a steel welding table having a 2″ thick top and held in this position during welding by two heavy-duty C-clamps on each plate.

The joint was welded without preheat in nine passes. A maximum interpass temperature of 250° F. was maintained throughout the welding of the joint. After welding, the joint was turned over and the root side of the weld was grooved out to remove irregularities and a sealing pass deposited in the groove. The completed joint was X-rayed at 2% sensitivity and no cracks, porosity or defects of any kind were observed.

Transverse tensile test specimens (⅝″ wide transverse slices) were then machined from the weldment. The reduced section of the specimens had a 0.252″ diameter with the weld positioned in the middle of the reduced section. All specimens were tensile tested to fracture in the as-welded condition. Two types of tests were conducted: (1) short-time tensile and ductility tests, including ultimate tensile strength (U.T.S.) in pounds per square inch (p.s.i.), 0.2% offset yield strength (Y.S.) in p.s.i., percent reduction in area (R.A.) and percent elongation (Elong.), both at room temperature and 1200° F.; and (2) stress-rupture tests at 1200° F. The results of these tests are summarized in the following Table VI:

Table VI

| Type of test | Test temp., °F. | U.T.S., p.s.i. | 0.2% offset Y.S., p.s.i. | Elong. in 1″, percent | R.A., percent | Stress, p.s.i. | Rupture life, hours |
|---|---|---|---|---|---|---|---|
| (1) | 70 | 116,800 | 66,200 | 29.3 | 34.5 | | |
| (1) | 1,200 | 86,500 | 54,500 | 20.0 | 24.0 | | |
| (2) | 1,200 | | | 2.5 | 5.5 | 58,000 | 427.7 |
| (2) | 1,200 | | | 1.0 | 6.2 | 60,000 | 120.4 |
| (2) | 1,200 | | | 2.0 | 7.8 | 61,000 | 107.6 |

These data indicate the high strength of this weld at both room temperature and at 1200° F.

EXAMPLE V

Another butt weld, similar in all respects to the one made in Example IV, was performed. This second weld was then X-rayed at 2% sensitivity and was found to be completely free of defects. The weld was cross-sectioned to provide three ⅜″ wide transverse slices for side bend tests.

The three transverse slices ⅜″ wide and also the ⅝″ wide slices for tensile tests were polished on both sectioned surfaces of each slice using a 200 grit rubber-bonded abrasive polishing wheel, after which they were etched with mixed acids to outline weld grain structure and examined at 30× for defects. No defects of any kind were observed in any of the cross sections. The ⅜″ wide slices were then subjected to a 180° transverse side-bend test. This test was performed by bending the ⅜″ wide sections over a 1½″ diameter steel rod such that the weld cross section was deformed transversely. The bends were continued until the legs were substantially parallel. The specimens were then examined at 30× for defects and no cracks or defects of any kind were observed in any of the three side-bend test specimens.

EXAMPLE VI

An X-weld crack test was performed to determine the resistance of welds produced by the electrode of this invention to hot cracking. The X-weld test specimens used for this purpose consisted of two 1″ square bars of an alloy having a composition substantially the same as the plate composition set forth in Example IV. Each bar was 3″ long. The two bars were tack-welded together at the ends such that the 3″ dimension of the bars formed a double V-groove type joint configuration.

The welding electrode used had a 5/32″ diameter core wire of the same composition as set forth in Example I. Sets of weld passes were deposited in the V-groove of the X-weld specimen alternating from one side of the X-weld to the other with each set. Each set consisted of two passes. A maximum interpass temperature was maintained at 250° F. throughout the test.

When the V-grooves were completely filled with weld metal, the specimen was sectioned transversely in three places 1″ apart in a direction normal to the 3″ length. The resulting three 1″ wide sections were polished on each face, etched and examined at 30× for evidence of cracks or other defects. No cracks, porosity or defects of any kind were observed.

To further demonstrate the soundness of this weld, a transverse slice about ⅛″ thick was cut from one of the 1″ wide sections and submitted to a 180° free U-bend with a portion of the weld cross section in transverse tension. At the completion of this extremely severe test, the bent surface was examined at 30× and found to be substantially free of any cracking with the exception of one small fissure about 1/64″ long which is more than satisfactory under such rigorous test conditions.

EXAMPLE VII

Another X-weld test was made to determine the resistance of welds deposited by the electrode of this invention to hot cracking in making a dissimilar joint between a nickel-chromium alloy and austenitic stainless steel. Such a combination would be commonly encountered in the construction of steam power plants and it is important to determine the compatibility of this electrode for this type of joint.

The test described was similar to that set forth in Example VI. However, for this test, ¾" square bars 3" long were used instead of the 1" bars of Example VI. One of the bars had a composition substantially identical to the bar of Example VI while the other was of AISI Type 316 stainless steel having a chemical analysis of 18.8% chromium, 10.6% nickel, 1.21% manganese, 0.016% carbon, 0.18% molybdenum, 0.08% copper, 0.67% silicon, 0.025% phosphorus, 0.02% sulfur with the balance being essentially iron.

The welding electrode used for the test was of the same composition as described in Example I. Upon completion of welding, the specimen was sectioned and prepared for examination as described in Example VI. No cracks, porosity or defects of any kind in any of the cross sections were observed in the 30× examination, thus indicating the tolerances of the weld deposits of this invention to the detrimental effects of iron dilution.

To further demonstrate the soundness of this weld, a transverse slice ⅛" thick was cut from the X-weld and subjected to a 180° free U-bend test with a portion of the weld cross section in transverse tension. At the completion of this extremely severe test the bent surface which was in tension was examined at 30× and no cracks or defects of any kind were observed which shows the unexpected tolerance of the weld deposits produced by the electrodes of this invention for iron-dilution.

EXAMPLE VIII

Since there is often a need in the construction of power plant components to join carbon steel or some similar ferrous alloy to a higher alloy, tests were made to determine the capability of the electrode of this invention to accomplish such a purpose. In view thereof, an overlay was prepared on plain carbon steel containing 0.2% carbon, 0.45% manganese, 0.28% sulfur, 0.01% phosphorus with the balance being essentially iron. The carbon steel plate was 6" long, 3" wide and ⅜" thick. The steel plate was held to a 2" thick welding table by four C-clamps, one at each corner of the plate, during welding. The welding electrode used in making the overlay had a composition as set forth in Example I. The overlay consisted of a single layer of 6 overlapping beads forming a deposit about 1⅝" x 6" on the surface of the carbon steel plate.

When the overlay was completed, the top surface was machined in a shaper to remove all irregularities and weld bead ripples. This operation reduced the thickness of the overlay to ⅛" above the surface of the carbon steel plate. The surface was then polished, etched and examined at 30× for evidence of defects. No cracks, porosity or defects of any kind were observed.

The overlay was then subjected to a 180° face bend test by bending the overlay over a 1½" diameter steel bar such that the tension was in the direction of the 6" longitudinal overlay dimension. The test was stopped when the two legs of the U-bend specimen were substantially parallel. The bent surface was then reexamined at 30× for defects. This examination revealed the presence of only a few small fissures but these were less than 1/64" and all were invisible to the unaided eye.

The present invention is particularly applicable whenever there is a need to produce nickel-chromium welds having high strength at elevated temperatures such as in the construction of power plant components. In such construction, it is necessary to make overlays and joints between carbon, carbon-molybdenum or chromium-molybdenum steels and austenitic stainless steels as well as between or on nickel-chromium alloys, and the electrodes of this invention are especially adapted to make such welds. For example, the present invention is applicable to the welding and overlaying of similar and/or dissimilar metals and alloys such as nickel, iron, nickel alloys and iron alloys containing up to 100% nickel, up to 100% iron, up to about 35% copper, up to 10% columbium, up to 10% tungsten, up to 10% molybdenum, up to about 0.35% carbon, up to about 30% cobalt, up to about 5% silicon, up to about 30% manganese, up to about 60% chromium and up to about 5% each of aluminum and/or titanium. Thus, an outstanding feature of the electrodes of this invention is their versatility. They are not limited to making welds to base plates of matching compositions but are also capable of producing quality weld deposits of high integrity between a wide variety of ferrous and non-ferrous alloys. The present invention is particularly suited for the welding of nickel-chromium alloys to themselves; for joining these alloys to steel and for overlaying such materials on steel; for welding the clad side of nickel-chromium alloy clad steels and for joining nickel-chromium alloys, mild steel, AISI 200, 300, 400 and 500 steels to each other or to themselves in all positions with freedom from such detrimental characteristics as porosity and hot cracking even when appreciable dilution of the weld with iron is encountered. The high level of weld quality made possible through the employment of the electrodes of this invention permits the use of arc-welding techniques in even the most critical applications, where assurance of top quality is of the utmost importance.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the present invention and appended claims.

We claim:

1. A welding electrode having a core containing, by weight, about 15% chromium, about 7% iron, about 3% tungsten, about 3% molybdenum, about 3% columbium, about 0.6% titanium, about 0.4% aluminum, about 0.2% manganese, less than about 0.05% silicon, about 0.02% magnesium, about 0.05% carbon, about 0.03% zirconium, about 0.005% boron, less than about 0.1% cobalt with the balance essentially nickel and having a flux containing, by weight, about 18% titania, about 18% manganese carbonate, about 25% calcium carbonate, about 10.8% columbium, about 7.2% iron, about 18% cryolite and about 3% bentonite.

2. A welding electrode having a core containing, by weight, about 13% to about 20% chromium, about 6% to about 8% iron, about 2.5% to about 3.5% tungsten, about 1.5% to about 3.5% molybdenum, about 2.5% to about 6.5% columbium, the sum of the percentages of tungsten, molybdenum and columbium being at least about 8.75%, about 0.5% to about 0.9% titanium, up to about 0.5% aluminum, up to about 1.5% manganese, up to about 0.05% silicon, about 0.01% to about 0.1% magnesium, up to about 0.07% carbon, up to about 0.03% zirconium, up to about 0.005% boron, up to about 0.1% cobalt with the balance essentially nickel in amounts of at least about 60% and having a flux containing, in parts by weight, about 20 to about 30 parts calcium carbonate, about 12 to about 25 parts manganese carbonate, about 12 to about 25 parts titanium dioxide, about 1 to about 25 parts columbium, about 12 to about 25 parts cryolite and about 2 to about 5 parts bentonite.

3. A welding electrode having a core containing, by weight, about 13% to about 20% chromium, about 6% to about 8% iron, about 2.5% to about 3.5% tungsten, about 1.5% to about 3.5% molybdenum, about 2.5% to about 6.5% columbium, the sum of the percentages of tungsten, molybdenum and columbium being at least about 8.75%, about 0.5% to about 0.9% titanium, up to about 0.5% aluminum, up to about 1.5% manganese, up to about 0.05% silicon, about 0.01% to about 0.1% magnesium, up to about 0.07% carbon, up to about 0.03% zirconium, up to about 0.005% boron, up to about 0.1% cobalt with the balance essentially nickel in amounts of at least about 60% and having a flux containing, in parts by weight, about 10 to about 35 parts titania, about 5 to about 30 parts manganese carbonate, about 15 to about 40 parts alkaline earth metal carbonate, up to about 20 parts manganese, up to about 12.5 parts tungsten, up to about 12.5 parts molybdenum, up to about 35 parts columbium and about 10 to about 35 parts cryolite; said electrode containing, by weight of the electrode, up to about 4% molybdenum, up to about 3% tungsten, the sum of tungsten and twice molybdenum being at least about 1.5% and about 1.5% to about 10% columbium with the columbium, molybdenum and tungsten being so correlated that the sum of columbium, tungsten and twice molybdenum is about 3.5% to about 15%.

4. A welding electrode having a core containing, by weight, about 10% to about 25% chromium, up to about 10% iron, up to about 2% titanium, up to about 1% aluminum, the sum of aluminum and titanium being about 0.5% to about 2%, up to about 3% manganese, up to about 0.3% magnesium, up to about 0.1% carbon, up to about 0.05% zirconium, up to about 0.005% boron, up to about 2% cobalt, up to about 8% columbium, up to about 8% molybdenum, up to about 4% tungsten with the balance, apart from the usual deoxidants, impurities and incidental elements, being nickel in amounts of at least about 55% and having a flux containing, in parts by weight, about 20 to about 30 parts calcium carbonate, about 12 to about 25 parts manganese carbonate, about 12 to about 25 parts titanium dioxide, about 1 to about 25 parts columbium, about 12 to about 25 parts cryolite and about 2 to about 5 parts bentonite; said electrode containing, by weight of the electrode, about 2% to about 8% columbium, about 1.8% to about 2.5% tungsten and about 1.8% to about 2.5% molybdenum.

5. A welding electrode having a core containing, by weight, about 10% to about 25% chromium, up to about 10% iron, up to about 2% titanium, up to about 1% aluminum, the sum of titanium and aluminum being about 0.5% to about 2%, up to about 0.5% silicon, up to about 3% manganese, up to about 0.3% magnesium, up to about 0.1% carbon, up to about 0.05% zirconium, up to about 0.005% boron, up to about 2% cobalt, up to about 8% columbium, up to about 8% molybdenum, up to about 4% tungsten with the balance, apart from the usual deoxidants, impurities and incidental elements, being nickel in amounts of at least about 55% and having a flux containing, in parts by weight, about 10 to about 35 parts titania, about 5 to about 30 parts manganese carbonate, about 15 to about 40 parts alkaline earth metal carbonate selected from the group consisting of calcium carbonate, barium carbonate, strontium carbonate and combinations thereof, up to about 20 parts manganese, up to about 12.5 parts tungsten, up to about 12.5 parts molybdenum, up to about 35 parts columbium and about 10 to about 35 parts cryolite; said electrode containing, by weight of the electrode, up to about 4% molybdenum, up to about 3% tungsten, the sum of tungsten and twice molybdenum being at least about 1.5% and about 1.5% to about 10% columbium with the columbium, molybdenum and tungsten being so correlated that the sum of columbium, tungsten and twice molybdenum is about 3.5% to about 15%.

6. A columbium-containing arc-welding electrode consisting of a nickel-chromium alloy core wire and a flux, said flux comprising non-metallic fluxing and slagging substances consisting essentially of manganese carbonate, calcium carbonate, titania and cryolite, the core of said electrode along with the manganese carbonate of said flux and columbium being so correlated as to yield a nickel-chromium deposit containing, by weight, about 14% to about 17% chromium, about 6% to about 8% iron, about 2.5% to about 3.5% tungsten, about 1.5% to about 3.5% molybdenum, about 2.5% to about 6.5% columbium, the sum of the percentages of tungsten, molybdenum and columbium being at least about 8.75%, up to about 0.2% titanium, up to about 0.1% aluminum, about 0.5% to about 2% manganese, up to about 0.7% silicon, up to about 0.03% magnesium, up to about 0.1% carbon, up to about 0.01% zirconium, up to about 0.003% boron, up to about 0.1% cobalt with the balance nickel in amounts of at least about 60%.

7. A columbium-containing arc-welding electrode consisting of a nickel-chromium alloy core and a flux, said flux comprising non-metallic fluxing and slagging substances consisting essentially of manganese carbonate, alkaline earth metal carbonate, titania and cryolite, the core of said electrode along with the manganese carbonate of said flux and columbium being so correlated as to yield a nickel-chromium deposit containing, by weight, about 10% to about 25% chromium, up to about 10% iron, about 0.2% to about 4.5% manganese, up to about 1% silicon, up to about 0.1% magnesium, up to about 0.15% carbon, up to about 0.01% zirconium, up to about 0.003% boron, up to about 2% cobalt, up to about 0.7% titanium, up to about 0.5% aluminum, up to about 4% tungsten, up to about 5% molybdenum, the sum of tungsten percent and twice molybdenum percent being at least about 1.5%, about 1.5% to about 8% columbium, the sum of the percentages of columbium and tungsten plus twice molybdenum being at least about 3.5% with the balance essentially nickel in amounts of at least about 55%.

References Cited by the Examiner

UNITED STATES PATENTS 3,024,137  3/62  Witherell _____ 117—205

RICHARD M. WOOD, *Primary Examiner.*